United States Patent
Nachfolger et al.

[11] Patent Number: 5,723,514
[45] Date of Patent: Mar. 3, 1998

[54] HEATSET INTAGLIO PRINTING INK

[75] Inventors: Solomon J. Nachfolger, Monsey, N.Y.; Hugo Babij, Waldwick, N.J.; Joseph Malanga, Clark, N.J.; Ralph H. Reiter, River Vale, N.J.; Walter J. Glesias, Elmwood, N.J.

[73] Assignee: Sun Chemical Corporation, Fort Lee, N.J.

[21] Appl. No.: 489,912

[22] Filed: Jun. 13, 1995

[51] Int. Cl.$^6$ .................................................... C09D 11/10

[52] U.S. Cl. .................. 523/161; 523/427; 523/428; 260/DIG. 38; 524/310; 524/313; 524/423; 524/425; 524/451; 524/487; 106/31.13; 106/31.6

[58] Field of Search .................................. 523/161, 427, 523/428; 260/DIG. 38; 524/310, 313, 423, 425, 451, 487; 106/27 R, 22 R, 20 R

[56] References Cited

U.S. PATENT DOCUMENTS

| | | | |
|---|---|---|---|
| 4,166,054 | 8/1979 | Meeske et al. | 523/423 |
| 4,401,470 | 8/1983 | Bridger | 106/20 |
| 4,689,390 | 8/1987 | Suzuki et al. | 528/118 |
| 5,100,934 | 3/1992 | Glesias et al. | 523/456 |
| 5,101,010 | 3/1992 | Dickens et al. | 528/272 |
| 5,367,005 | 11/1994 | Nachfolger | 523/403 |

Primary Examiner—Vasu Jagannathan
Assistant Examiner—John J. Guarriello
Attorney, Agent, or Firm—Sidney Persley; Jack Matalon

[57] ABSTRACT

The invention relates to a heatset intaglio printing ink especially suited for the intaglio printing of security documents such as currency, postage stamps, stock certificates, bank notes and the like. The ink comprises: a) an epoxy resin ester reacted with an unsaturated monobasic acid and a reactive monomer, b) a glycol and/or glycol ether, c) a pigment, d) a drier and e) a compound obtained by reacting an amine/epoxy adduct with a phenolic resin or polyhydric phenol compound.

14 Claims, No Drawings

HEATSET INTAGLIO PRINTING INK

FIELD OF THE INVENTION

The invention relates to a heatset intaglio printing ink. The ink has been found to be especially useful for the printing of security documents such as currency, checks, stock certificates, bank notes, tickets, etc.

BACKGROUND OF THE INVENTION

The term "intaglio printing" refers to a printing process wherein a printing cylinder or printing plate carries the engraved pattern and the engraved recess is filled with printing ink to be transferred to the printing substrate in order to create the document. In this type of printing, typically a rotating engraved cylinder (usually manufactured from steel or nickel and plated with chromium) is supplied with ink by one or more template inking cylinders by which a pattern of inks of different color is transferred to the printing cylinder. Any excess of ink on the surface of the cylinder is then wiped off by a rotating wiper cylinder covered by a plastisol, using a dilute aqueous solution of sodium hydroxide and a surfactant as an emulsifying medium for the wiped-off excess ink. Thereafter, the printing pattern is transferred, under a pressure of up to 27 kg/mm², to the substrate.

The most widespread process for printing security documents, especially currency, is sheetfed intaglio. Sheetfed intaglio inks are based on oxidizable resins and alkyds and are very slow drying. Typically, one side of the currency is printed first and after 24-48 hours, the other side is printed. The typical printing speed of sheetfed intaglio is about 45-75 m/min. U.S. Pat. No. 4,966,628 discloses typical sheetfed intaglio inks suitable for printing of security documents. U.S. Pat. No. 5,100,934 disclosing heatset intaglio printing inks suitable for printing of currency was issued on Mar. 31, 1992 to the same assignee of the present invention. This patent describes printing ink formulations which have proven to provide excellent performance in respect to the heatset intaglio printing of currency. However, the ink formulations required a dryer temperature of 182° C. to cause the printed currency to "cure" to the point where such currency would pass the 24 hour laundry and 24 hour chemical rub tests required for acceptable currency. In contradistinction thereto, the heatset intaglio printing ink formulations of the present invention require a maximum dryer temperature of 119° C. to produce currency which will pass such tests. Thus the exit temperature at which the currency emerges from the press may be significantly reduced, thereby minimizing yellowing of the paper and concurrently maximizing paper flexibility.

The principal requirements for a security document heatset intaglio printing ink are as follows:

(a) correct rheological properties in respect to transfer of the ink to the printing cylinder and transfer therefrom to the substrate;

(b) ability of the excess ink to be easily and quantitatively removed from the non-image areas of the die surface by the wiping cylinder (wipeability);

(c) ease of cleaning the wiping cylinder by means of a dilute aqueous caustic soda solution containing about 1% of NaOH and 0.5% sulfonated castor oil or other surfactants;

(d) stability of the ink on the printing rollers; i.e. control of the evaporation of volatile materials during the printing process;

(e) film-forming characteristics allowing handling of the webs carrying printed films of up to 200μ thickness immediately after printing;

(f) proper drying properties when printing at speeds of up to 200m/min. with engravings of up to 200μ thickness;

(g) outstanding chemical and mechanical resistance of the printed document pursuant to specifications established by INTERPOL at the 5th International Conference on Currency and Counterfeiting in 1969 and by the U.S. Bureau of Engraving and Printing in BEP 88-214 (TN) §M5.

All of the foregoing requirements have been met by the ink compositions of the present invention. Indeed, the ink compositions of the present invention have been accepted by the Bureau of Engraving and Printing for use in printing currency by heatset intaglio printing.

DETAILS OF THE INVENTION

The intaglio printing inks of the present invention comprise:

a) a resin present in an amount of about 10 to 50 wt. %, preferably 15 to 30 wt. %, based on the weight of the ink, comprising the reaction product of (i) about 65-75 parts per hundred of the ester obtained from the esterification of about 40-60 parts per hundred of an epoxy resin with about 60-40 parts per hundred of a drying oil partially conjugated unsaturated fatty acid having an iodine number of about 125-185, an acid number of about 180-210 and a degree of conjugation of about 20-25%, said ester having an acid number below about 10, and (ii) about 35-25 parts per hundred of a mixture of about 20-28% of one or more unsaturated monobasic acids having a polymerizable double bond and about 80-72% of one or more reactive monomers having a polymerizable double bond, said epoxy resin comprising the condensation product of bisphenol A and epichlorohydrin and having an epoxide equivalent weight of about 400 to 1100 and represented by the structure below wherein n has a value of 0 to about 8; preferably n has an average value of about 2.2:

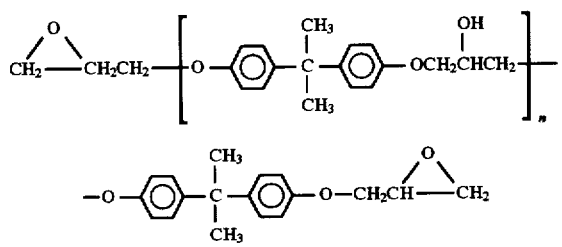

b) at least one glycol and/or glycol ether present in an amount of about 5 to 30 wt. %, preferably 15 to 30 wt. %, based on the weight of the ink;

c) at least one inorganic and/or organic pigment present in an amount of about 5 to 40 wt %, preferably 10-35 wt. %, based on the weight of the ink;

d) at least one drier, present in an amount of about 0.1 to 5 wt. %, preferably 0.2 to 4 wt. %, based on the weight of the ink; and e) about 0.1 to 5 wt. %, preferably 1.5 to 2.5 wt. %, based on the weight of the ink, of a compound obtained by reacting 1 part by weight of an amine/epoxy adduct (a) with 0.1 to 0.8 part by weight of a compound (b) selected from the group consisting of phenolic resins and polyhydric phenol compounds, said amine/epoxy adduct (a) obtained by reacting an amino compound (1) of the general formula

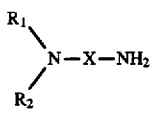

wherein $R_1$ and $R_2$ each represent an alkyl group having 1 to 5 carbon atoms and X represents an alkylene group having 1 to 5 carbon atoms, or an amino compound mixture comprising said amino compound (1) and 1-amino-4-ethylpiperazine (2) in a weight ratio of (1) to (2) of 70/30 to 99/1, with an epoxy resin (3) having more than one adjacent epoxy group on the average in the molecule, in such a ratio that the amount of the epoxy groups in the epoxy resin (3) is 0.8 to 2.5 equivalents per equivalent of the amino group in the amino compound(s) (1) or (1)+(2).

Drying oil partially conjugated unsaturated fatty acids which are useful for esterifying the epoxy resin are those available from safflower oil, sunflower oil, tung oil, canola oil, tall oil, dehydrated castor oil, soya bean oil, oiticica oil, plukenetia oil, perilla oil, hemp-seed oil, walnut oil, tobacco seed oil and linseed oil.

Typically the esterification of the epoxy resin with the drying oil partially conjugated unsaturated fatty acid is carried out at a temperature of about 220°–240° C. and continued until an acid number below 10 is obtained. The ester is then dissolved in a glycol ether such as ethylene glycol monobutyl ether to a concentration of 60% non-volatile and a Gardner-Holdt viscosity of K-N.

The 60% non-volatile solution of the esterified epoxy resin is thereafter reacted with a mixture of 20–28% of one or more unsaturated monobasic acids having a polymerizable double bond and 80–72% of one or more reactive monomers having a polymerizable double bond. Suitable monobasic acids include acrylic acid, methacrylic acid, crotonic acid and vinylacetic acid.

Suitable reactive monomers include styrene, vinyl toluene and the acrylic and methacrylic acid esters of $C_1$–$C_{10}$ alcohols such as methyl, ethyl, propyl, isopropyl, butyl, isobutyl and 2-ethylhexyl.

Typically, 65–75 parts of the esterified epoxy resin will be reacted with 35–25 parts of the mixture of unsaturated monobasic acids and reactive monomers. The reaction between the esterified epoxy resin and such mixture may be carried out over a 2 hour period at a temperature of about 120°–150° C. in the presence of about 1–6 wt. % of a peroxide catalyst such as di-tertiary butyl peroxide, benzoyl peroxide, cumene peroxide, tertiary butyl perbenzoate, tertiary butyl hydroperoxide, and the like. The resultant solution is then neutralized with an amine to a pH of about 5 to 9 to make it water dilutable.

Resins of the type employed in the intaglio printing inks of the present invention are well known and may be prepared in accordance with the teachings of U.S. Pat. No 4,166,054 to Charles J. Meeske et al. and assigned to Reichhold Chemicals, Inc., and incorporated herein by reference. These resins are commercially available; a useful example of such resin is Reichhold Chemicals' Epotuf® Epoxy Ester Resin 92–737 dissolved in a suitable solvent such as diethylene glycol monobutyl ether and is hereinafter referred to as "Varnish 90–164". This varnish contains 70±2% non-volatiles, has an acid number of 54–60 and a Gardner-Holdt viscosity of $Z_7$–$Z_8$.

Suitable glycols and glycol ethers include ethylene glycol, diethylene glycol, propylene glycol, dipropylene glycol, tripropylene glycol, butylene glycol, octylene glycol, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, dipropylene glycol monomethyl ether, tripropylene glycol monomethyl ether and propylene glycol monophenyl ether, and mixtures thereof.

The pigment may be any desired inorganic and/or organic pigment suitable for heatset intaglio printing such as CI Pigment Yellow 12, CI Pigment Yellow 42, CI Pigment Black 7, CI Pigment Black 11, CI Pigment Red 9, CI Pigment Red 23, CI Pigment Red 146, CI Pigment Red 224, CI Pigment Green 7, CI Pigment Green 36, CI Pigment Blue 15:3, CI Pigment Violet 23 and CI Pigment Violet 32.

Suitable driers are the heavy metal salts of complex fatty acids, present singly or as mixtures. Examples of useful driers are the octoates, resinates, naphthenates, neodecanoates, tallates and linoleates and mixtures thereof of metals such as cobalt, manganese, magnesium, zinc, cerium, zirconium and mixtures thereof. If desired, a small amount, e.g. 0.1–1.0 wt. %, based on the weight of the ink, of a drier activator may be included in order to enhance the activity of the drier; a suitable drier activator is 2,2'-bipyridyl.

Suitable examples of amino compound (1) include dimethyl aminopropylamine, diethyl aminopropylamine, dipropyl aminopropylamine, dibutyl aminopropylamine, dimethyl aminoethylamine, dipropyl aminoethylamine and dibutyl aminoethylamine. The preferred amino compounds (1) are dimethyl aminopropylamine and diethyl aminopropylamine.

The compounds e) employed in the ink formulations of the present invention are well known in the prior art and may be prepared in accordance with the teachings of U.S. Pat. No. 4,689,390 issued Aug. 25, 1987 to Suzuki et al. These salts are also commercially available from Pacific Anchor Chemical Corporation in the form of products known as Ancamine® 2014A, Ancamine® 2014AS and Ancamine® 2014FG. These products are all white powders in which amino compound (1) comprises diethyl aminopropyldiamine and differ from one another only in their particle sizes, i.e. Ancamine® 2014AS is a micronized grade of Ancamine® 2014A and Ancamine® 2014FG is a fine-grind version of Ancamine® 2014AS (2014 AS has a particle size of 90% ≦30µ, whereas 2014FG has a particle size of 90% ≦6µ). For the present invention, Ancamine® 2014FG is preferred.

Preferably, the ink will contain one or more fillers in an amount of about 1 to 35 wt. %, based on the weight of the finished ink. Suitable fillers include china clay, calcium carbonate, calcium sulfate, talc, silica, corn starch, titanium dioxide, alumina and mixtures thereof. The ink may also contain about 1 to 5 wt. %, based on the weight of the finished ink, of a wax to improve scuff resistance. Suitable waxes include polytetrafluoroethylene waxes, polyethylene waxes, Fischer-Tropsch waxes, silicone fluids and mixtures thereof.

The finished inks will typically have a viscosity in the range of 2 to 30 poise at 40° C. and 100 second$^{-1}$ shear rate and may be printed at speeds of up to 200 m/min. The inks dry rapidly—typically the imprinted substrate will be cured in ovens of 5–6 meters in length at temperatures of 80° to 180° C. and a residence time of 0.1 to 2 seconds. Thus a second color may be printed almost instantaneously upon a previously-printed color.

The following examples shall serve to illustrate the invention. Unless otherwise indicated, all parts and percentages are by weight.

EXAMPLE 1

A black heatset printing ink base was prepared by combining the ingredients set forth below and thereafter grinding the mixture on a 3-roll mill until a 4/2 grind was obtained. The finished ink was then prepared by mixing the ink base and the indicated ingredients for 10–20 minutes while maintaining a temperature of < 49° C. The black finished ink had a viscosity of 13.0 poise at 40° C. and a 100 second$^{-1}$ shear rate.

| Ingredient | Parts |
| --- | --- |
| INK BASE | |
| Varnish 90-164 | 29.7 |
| Butyl Carbitol | 3.5 |
| CI Pigment Black 11 | 29.8 |
| CI Pigment Black 7 | 1.7 |
| Polytetrafluoroethylene Wax | 3.9 |
| Silicone Fluid | 0.5 |
| Calcium Carbonate | 9.9 |
| Total | 79.0 |
| FINISHED INK | |
| Ink Base | 79.0 |
| Varnish 90-164 | 5.0 |
| Butyl Carbitol | 12.5 |
| 5% Cobalt Neodecanoate Drier | 0.4 |
| 5% Manganese Neodecanoate Drier | 0.4 |
| 8% Zinc Octoate Drier | 0.5 |
| 2,2'-Bipyridyl Drier Activator | 0.2 |
| Ancamine ® 2014FG | 2.0 |
| Total | 100.0 |

EXAMPLE 2

Following the procedure set forth in Example 1, a printing ink base was prepared with the ingredients listed below. In addition, a printing ink toner was prepared in the same manner using the indicated ingredients. The printing ink base and printing ink toner were combined with the indicated ingredients in the same manner as in Example 1 to form a green finished ink which had a viscosity of 16.0 poise at 40° C. and 100 second$^{-1}$ shear rate.

| Ingredient | Parts |
| --- | --- |
| INK BASE | |
| Varnish 90-164 | 32.9 |
| Butyl Carbitol | 7.5 |
| CI Pigment Green 7 | 2.3 |
| CI Pigment Black 7 | 0.8 |
| CI Pigment Yellow 42 | 12.2 |
| Polytetrafluoroethylene Wax | 3.8 |
| Silicone Fluid | 0.5 |
| Calcium Carbonate | 23.5 |
| Total | 83.5 |
| INK TONER | |
| Varnish 90-164 | 0.2 |
| CI Pigment Blue 15:3 | 0.1 |
| CI Pigment Violet 23 | 0.1 |
| Total | 0.4 |
| FINISHED INK | |
| Ink Base | 83.5 |
| Ink Toner | 0.4 |
| Butyl Carbitol | 12.6 |
| 5% Cobalt Neodecanoate Drier | 0.4 |
| 5% Manganese Neodecanoate Drier | 0.4 |
| 8% Zinc Octoate Drier | 0.5 |
| 2,2'-Bipyridyl Drier Activator | 0.2 |
| Ancamine ® 2014FG | 2.0 |
| Total | 100.0 |

EXAMPLE 3

Following the procedure set forth in Example 2, a printing ink base and printing ink toner was prepared with the ingredients listed below. The printing ink base and printing ink toner were combined with the indicated ingredients in the same manner as in Example 1 to form a black finished ink which had a viscosity of 25.3 poise at 40° C. and 100 second$^{-1}$ shear rate.

| Ingredient | Parts |
| --- | --- |
| INK BASE | |
| Varnish 90-164 | 27.2 |
| Butyl Carbitol | 3.2 |
| CI Pigment Black 11 | 27.3 |
| CI Pigment Black 7 | 1.5 |
| Polytetrafluoroethylene Wax | 3.6 |
| Silicone Fluid | 0.4 |
| Calcium Carbonate | 9.2 |
| Total | 72.4 |
| INK TONER | |
| Varnish 90-164 | 0.4 |
| CI Pigment Blue 15:3 | 0.3 |
| CI Pigment Violet 23 | 0.1 |
| Butyl Carbitol | 0.1 |
| Total | 0.9 |
| FINISHED INK | |
| Ink Base | 72.4 |
| Ink Toner | 0.9 |
| Butyl Carbitol | 16.3 |
| Varnish 90-164 | 4.6 |
| 5% Cobalt Neodecanoate Drier | 0.7 |
| 5% Manganese Neodecanoate Drier | 1.3 |
| 8% Zinc Octoate Drier | 1.7 |
| 2,2'-Bipyridyl Drier Activator | 0.2 |
| Ancamine ® 2014FG | 1.9 |
| Total | 100.0 |

EXAMPLE 4

Following the procedure set forth in Example 2, a printing ink base and printing ink toner was prepared with the ingredients listed below. The printing ink base and printing ink toner were thereafter combined with the indicated ingredients in the same manner as in Example 1 to form a black finished ink which had a viscosity of 13.0 poise at 40° C. and 100 second$^{-1}$ shear rate.

| Ingredient | Parts |
| --- | --- |
| INK BASE | |
| Varnish 90-164 | 29.3 |
| Butyl Carbitol | 3.4 |
| CI Pigment Black 11 | 29.4 |
| CI Pigment Black 7 | 1.6 |
| Polytetrafluoroethylene Wax | 3.9 |
| Silicone Fluid | 0.5 |
| Calcium Carbonate | 9.9 |
| Total | 78.0 |
| INK TONER | |
| Varnish 90-164 | 0.5 |
| CI Pigment Blue 15:3 | 0.3 |
| CI Pigment Violet 23 | 0.1 |
| Butyl Carbitol | 0.1 |
| Total | 1.0 |
| FINISHED INK | |
| Ink Base | 78.0 |
| Ink Toner | 1.0 |
| Butyl Carbitol | 12.5 |
| Varnish 90-164 | 5.0 |
| 5% Cobalt Neodecanoate Drier | 0.4 |
| 5% Manganese Neodecanoate Drier | 0.4 |
| 8% Zinc Octoate Drier | 0.5 |
| 2,2'-Bipyridyl Drier Activator | 0.2 |
| Ancamine ® 2014FG | 2.0 |
| Total | 100.0 |

EXAMPLE 5

Following the procedure set forth in Example 2, a printing ink base and printing ink toner was prepared with the ingredients listed below. The printing ink base and printing ink toner were thereafter combined with the indicated ingredients in the same manner as in Example 1 to form a black finished ink which had a viscosity of 16.3 poise at 40° C. and 100 second$^{-1}$ shear rate.

| Ingredient | Parts |
| --- | --- |
| INK BASE | |
| Varnish 90-164 | 29.4 |
| Butyl Carbitol | 3.4 |
| CI Pigment Black 11 | 29.4 |
| CI Pigment Black 7 | 1.7 |
| Polytetrafluoroethylene Wax | 3.9 |
| Silicone Fluid | 0.5 |
| Calcium Carbonate | 7.2 |
| Total | 75.5 |
| INK TONER | |
| Varnish 90-164 | 0.5 |
| CI Pigment Blue 15:3 | 0.3 |
| CI Pigment Violet 23 | 0.1 |
| Butyl Carbitol | 0.1 |
| Total | 1.0 |
| FINISHED INK | |
| Ink Base | 75.5 |
| Ink Toner | 1.0 |
| Butyl Carbitol | 16.1 |
| Varnish 90-164 | 2.0 |
| 5% Cobalt Neodecanoate Drier | 0.4 |
| 5% Manganese Neodecanoate Drier | 0.4 |
| 8% Zinc Octoate Drier | 0.5 |
| 2,2'-Bipyridyl Drier Activator | 0.2 |
| Ancamine ® 2014FG | 3.9 |
| Total | 100.0 |

TEST RESULTS

The finished inks of Examples 1–5 were test printed in the following manner. The green finished ink of Example 2 was utilized as the currency ink for the obverse side, i.e. She back, of U.S. currency, while each black finished ink of Examples 1, 3, 4 and 5 was tested for the face, i.e. front, of the currency.

The currency was printed by heatset intaglio at the rates indicated in Table I below, with the back side, i.e. the green side, of the currency being printed first. After printing of the green side, the web passed through a two-zone drying oven about 5 m in length; the exit temperatures of the web are also indicated in Table I. After exiting the first oven, the front of the currency was printed with the finished black ink and passed at the same web speed through a second two-zone drying oven of the same temperature and length as the first oven.

After the currency was test printed, it was given a 1 and 7 days laundering test; in such test, a failure is indicated by a score of less than 4.0, with 6.0 being a perfect score. The test-printed currency was also exposed to various chemicals after aging for 1 and 7 day periods. The chemicals employed for such test comprised 2% $H_2SO_4$, 2% NaOH, 5.25% NaOCl, 190° ethanol, perchloroethylene, toluene, acetone, unleaded gasoline and mineral spirits. The number of chemical rub failures (out of the 9 test solvents) is also shown in Table I. In all cases, the test printed currency achieved a maximum 6.0 score on the crumple test, and no chemical soak failures. In addition, Table I shows the ability of these formulations to withstand lower web exit temperatures while still retaining durability and resistance properties, the principal benefits of this invention.

TABLE I

| Example No. | Web Exit Temp. °C. | Web Speed m/min. | Laundering | | Chemical Rub Fail | |
| --- | --- | --- | --- | --- | --- | --- |
| | | | 1 day | 7 days | 1 day | 7 days |
| 1,2 | 132 | 163 | 5.1 | 5.4 | 1 | 1 |
| 1,2 | 132 | 137 | 5.2 | 5.5 | 1 | 1 |
| 1,2 | 132 | 122 | 4.5 | 4.6 | 1 | 1 |
| 1,2 | 132 | 110 | 5.1 | 4.8 | 4 | 2 |
| 1,2 | 132 | 108 | 5.2 | 5.4 | 1 | 1 |
| 1,2 | 121 | 122 | 5.0 | 4.5 | 1 | 2 |
| 1,2 | 110 | 138 | 4.9 | 5.2 | 1 | 1 |
| 1,2 | 110 | 108 | 4.9 | 5.0 | 2 | 0 |

What is claimed is:

1. A heatset intaglio printing ink comprising:
   a) a resin present in an amount of about 10 to 50 wt. %, based on the weight of the ink, comprising the reaction product of (i) about 65–75 parts per hundred of the ester obtained from the esterification of about 40–60 parts per hundred of an epoxy resin with about 60–40 parts per hundred of a drying oil partially conjugated unsaturated fatty acid having an iodine number of about 125–185, an acid number of about 180–210 and a degree of conjugation of about 20–25%, said ester having an acid number below about 10, and (ii) about 35–25 parts per hundred of a mixture of about 20–28% of one or more unsaturated monobasic acids having a polymerizable double bond and about 80–72% of one or more reactive monomers having a polymerizable double bond, said epoxy resin comprising the condensation product of bisphenol A and epichlorohydrin and having an epoxide equivalent weight of about 400 to 1100 and represented by the structure below wherein n has a value of 0 to about 8:

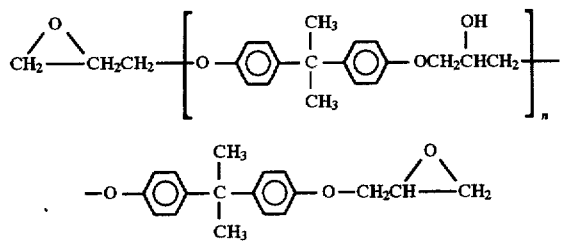

b) at least one glycol and/or glycol ether present in an amount of about 5 to 30 wt. %, based on the weight of the ink;

c) at least one inorganic and/or organic pigment present in an amount of about 5 to 40 wt %, based on the weight of the ink;

d) at least one drier, present in an amount of about 0.1 to 5 wt. %, based on the weight of the ink; and e) about 0.1 to 5 wt. %, based on the weight of the ink, of a compound obtained by reacting 1 part by weight of an amine/epoxy adduct (a) with 0.1 to 0.8 part by weight of a compound (b) selected from the group consisting of phenolic resins and polyhydric phenol compounds, said amine/epoxy adduct (a) obtained by reacting an amino compound (1) of the general formula

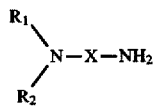

wherein $R_1$ and $R_2$ each represent an alkyl group having 1 to 5 carbon atoms and X represents an alkylene group having 1 to 5 carbon atoms, or an amino compound mixture comprising said amino compound (1) and 1-amino-4-ethylpiperazine (2) in a weight ratio of (1) to (2) of 70/30 to 99/1, with an epoxy resin (3) having more than one adjacent epoxy group on the average in the molecule, in such a ratio that the amount of the epoxy groups in the epoxy resin (3) is 0.8 to 2.5 equivalents per equivalent of the amino group in the amino compound(s) (1) or (1)+(2).

2. The ink of claim 1 wherein amino compound (1) is selected from the group consisting of dimethyl aminopropylamine, diethyl aminopropylamine, dipropyl aminopropylamine, dibutyl aminopropylamine, dimethyl aminoethylamine, dipropyl aminoethylamine and dibutyl aminoethylamine.

3. The ink of claim 2 wherein amino compound (1) comprises dimethyl aminopropylamine.

4. The ink of claim 2 wherein amino compound (1) comprises diethyl aminopropylamine.

5. The ink of claim 1 wherein n has an average value of about 2.2.

6. The ink of claim 1 wherein the drying oil partially conjugated unsaturated fatty acid is obtained from an oil selected from the group consisting of safflower oil, sunflower oil, tung oil, canola oil, tall oil, dehydrated castor oil, soya bean oil, oiticica oil, plukenetia oil, perilla oil, hempseed oil, walnut oil, tobacco seed oil and linseed oil.

7. The ink of claim 1 wherein the unsaturated monobasic acid is selected from the group consisting of acrylic acid, methacrylic acid, crotonic acid and vinyl-acetic acid.

8. The ink of claim 1 wherein the reactive monomer is selected from the group consisting of styrene, vinyl toluene and the acrylic and methacrylic acid esters of $C_1$–$C_{10}$ alcohols.

9. The ink of claim 1 wherein the glycol and/or glycol ether is selected from the group consisting of ethylene glycol, diethylene glycol, propylene glycol, dipropylene glycol, tripropylene glycol, butylene glycol, octylene glycol, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, dipropylene glycol monomethyl ether, tripropylene glycol monomethyl ether and propylene glycol monophenyl ether, and mixtures thereof.

10. The ink of claim 1 wherein the pigment is selected from the group consisting of CI Pigment Yellow 12, CI Pigment Yellow 42, CI Pigment Black 7, CI Pigment Black 11, CI Pigment Red 9, CI Pigment Red 23, CI Pigment Red 146, CI Pigment Red 224, CI Pigment Green 7, CI Pigment Green 36, CI Pigment Blue 15:3, CI Pigment Violet 23 and CI Pigment Violet 32.

11. The ink of claim 1 including a filler present in an amount of about 1 to 35 wt. %, based on the weight of the ink, and selected from the group consisting of china clay, calcium carbonate, calcium sulfate, talc, silica, corn starch, titanium dioxide, alumina and mixtures thereof.

12. The ink of claim 1 including a wax present in an amount of about 1 to 5 wt. %, based on the weight of the ink, and selected from the group consisting of polytetrafluoroethylene waxes, polyethylene waxes, Fischer-Tropsch waxes, silicone fluids and mixtures thereof.

13. The ink of claim 1 wherein the drier is selected from the group consisting of the octoates, resinates, naphthenates, neodecanoates, tallates and linoleates and mixtures thereof of metals selected from the group consisting of cobalt, manganese, magnesium, zinc, cerium, zirconium and mixtures thereof.

14. The ink of claim 1 including a drier activator comprising 2,2'-bipyridyl.

* * * * *